United States Patent [19]

Poppe et al.

[11] Patent Number: 4,476,280

[45] Date of Patent: Oct. 9, 1984

[54] POLYAMIDE COMPOSITIONS FROM MIXTURES OF TRIMETHYLHEXAMETHYLENE DIAMINE, HEXAMETHYLENE DIAMINE AND DIACIDS

[75] Inventors: Wassily Poppe, Lombard; Yu-Tsai Chen, Glen Ellyn, both of Ill.

[73] Assignee: Standard Oil Company, Chicago, Ill.

[21] Appl. No.: 466,898

[22] Filed: Feb. 16, 1983

[51] Int. Cl.$^3$ .............................................. C08G 69/26
[52] U.S. Cl. ................................... 524/606; 524/607; 528/338; 528/339; 528/340; 528/347; 528/349
[58] Field of Search ............... 528/349, 338, 339, 340, 528/347; 524/606, 607

[56] References Cited

U.S. PATENT DOCUMENTS

| | | | |
|---|---|---|---|
| 3,145,193 | 8/1964 | Gabler | 528/349 |
| 3,150,113 | 9/1964 | Gabler | 528/349 |
| 3,294,758 | 12/1966 | Gabler | 528/338 |
| 3,454,536 | 7/1969 | Schade et al. | 528/349 |
| 3,728,312 | 4/1973 | Schneider et al. | 528/349 |
| 3,759,877 | 9/1973 | Huhn et al. | 528/349 |
| 3,842,046 | 10/1974 | Schmitt et al. | 528/349 |
| 3,932,362 | 1/1976 | Schneider et al. | 528/349 |

*Primary Examiner*—Harold D. Anderson
*Attorney, Agent, or Firm*—Gunar J. Blumberg; William T. McClain; William H. Magidson

[57] ABSTRACT

Novel crystalline copolymers having heat deflection temperatures in excess of 305° C. and prepared from hexamethylene diamine, trimethylhexamethylene diamine and either mixtures of terephthalic acid and adipic acid or mixtures of terephthalic acid, isophthalic acid and adipic acid. The high heat deflection of these polyamides enables them to be used in applications such as a hood for an automobile, a shroud for a lawn mower, chain saw guards and in electrical connection applications.

28 Claims, No Drawings

POLYAMIDE COMPOSITIONS FROM MIXTURES OF TRIMETHYLHEXAMETHYLENE DIAMINE, HEXAMETHYLENE DIAMINE AND DIACIDS

BACKGROUND OF THE INVENTION

1. Field of the Invention

The field of this invention relates to crystalline copolyamides from mixtures of hexamethylene diamine (HMDA) and trimethylhexamethylene diamine (TMHMDA) and either mixtures of terephthalic acid (TA) and adipic acid (AA) or mixtures of TA, isophthalic acid (IA) and AA.

Filled compositions from HMDA, TMHMDA and TA, AA and HMDA, TMHMDA and TA, IA, and AA having heat deflection temperatures in excess of 305° C. are unknown to the prior art. Likewise, processes for making crystalline copolyamides from HMDA, TMHMDA and the aforementioned diacids giving polymers of injection moldable quality have not been contemplated in the prior art.

References of interest include U.S. Pat. No. 3,553,288, which discloses polyester blends, some components of which can be TA, IA or AA. U.S. Pat. No. 4,218,509 discloses various fibers. Transparent terpolyamides from TA, IA, AA and HMDA moieties are disclosed in Japanese Pat. No. J 7021116. British patent application No. 604/49 discloses isomorphous TA, AA-HMDA polyamides, German Offenlegungsschrift No. 2,651,534 discloses fiber-forming random terpolyamides including TA and IA and very small amounts of AA with HMDA; Japan Kokai Nos. J71018809, J52085516 and J71028218 disclose fibers from TA, IA, AA and HMDA polyamides. In reviewing all these references it is clear that crystalline copolyamides manufactured from HMDA, TMHMDA and mixtures of TA and AA or HMDA, TMHMDA and mixtures of TA, IA and AA including filled compositions of these polymers having heat deflection temperatures in excess of 305° C. have not been contemplated by the prior art.

The general object of this invention is to provide molding compositions reinforced with glass fibers, glass beads, minerals or a mixture thereof made from polyamides derived from HMDA, TMHMDA and mixtures of TA and AA or from HMDA, TMHMDA and mixtures of TA, IA and AA. Other objects include a process for the manufacture of the crystalline polyamide and catalysts for the polycondensation reaction.

We have now found that filled molded copolyamides can be obtained from mixtures of HMDA, TMHMDA and mixtures of TA and AA or from HMDA and mixtures of TA, IA and AA. The mole ratio of MHDA to TMHMDA can suitably be in the range of about 55/45 to about 98/2, preferably about 60/40 to about 95/5. The mole ratio of the mixture of HMDA and TMHMDA to TA and AA can be in the range of about 100/65/35 to 100/95/5. The mole ratio of the mixture of HMDA and TMHMDA to TA, and the mixture of IA and AA can be in the range of about 100/61/39 to 100/95/5. Our crystalline polyamide copolymer composition comprise the following recurring moieties:

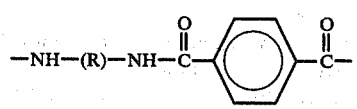

-continued
and

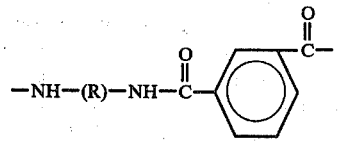

and

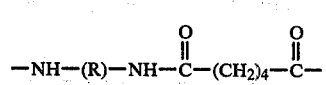

wherein R is a mixture of a straight chain aliphatic hydrocarbon radical comprising six carbon atoms and an alkyl substituted saturated hydrocarbon chain, six carbon atoms in length, in which the alkyl substitution comprises three methyl groups with two of the three methyl groups on the same carbon atom wherein the mole ratio of the two hydrocarbons is about 55/45 to about 95/5 and wherein the mole ratio of the two hydrocarbons is about 55/45 to about 95/5 and wherein the mole ratio of A/C or a mixture of B and C is about 61/39 to 95/5, and the ratio of B to C is about 38/1 to about 1/38. The crystalline polyamides, when filled and molded with glass fibers, glass beads, minerals or a mixture thereof, have a heat deflection temperature in excess of 305° F., as determined by ASTM Method D648. This is an unusual feature and completely unexpected from the prior art since comparable polyamides have much lower heat deflection temperatures. The importance of having high heat deflection temperatures is that it enables the injected copolyamides to be used in applications such as the hood of an automobile, shroud for a lawn mower, chain saw guard, and in electrical connector applications. In addition to the high heat deflection temperature, the tensile strength of these copolyamides is in excess of 35,000 psi which is as high or higher than that of die cast aluminum or zinc while the specific gravity of our copolyamides is about one-half of that of aluminum or zinc. Thus, these copolyamides are particularly useful in transportation equipment applications. These filled copolyamides also have a flexural modulus in excess of 1,000,000 psi as determined by ASTM Method D790. This property is advantageous in applications requiring dimensional stability.

Our copolyamide composition can be filled with about 10 to 60 weight percent glass fibers, glass beads, minerals, or a mixture thereof, or graphite fibers. Advantageously, the molding composition may contain from about 40 to about 60 weight percent of glass fibers, glass beads, minerals, or a mixture thereof, or graphite fibers. Our studies have shown that high heat deflection temperatures and also the cost of molding products derived from polyterephthalamides can be reduced by substituting for part of the polymer, about 40 to about 60 weight percent thereof with glass fibers, glass beads, minerals, or graphite fibers. These glass filled polyamides and copolyamides are much more economical than molding compositions prepared without the use of the glass fibers, glass beads, minerals, or graphite fillers. The use of polyimides and amides as engineering plastics has been limited only by their relatively high cost. Thus, employing our invention, through which the inherent cost can be brought down, the commercial application of polyamides requiring very high flexural strength can be greatly expanded. We have prepared monofilaments using our novel polyamides with monofilament, the process starts with a single screw extruder to supply a melt for conversion to fiber. The die for monofilament is similar to the multifilament die. The monofilament process is a slower operation, typically 50 to 200 feet/minute. For the melt spinning operations 40 to 80 feet/minute were used for the monofilament processing. The monofilament on the other hand is water quenched with much less melt draw down. The monofilament is subsequently drawn with heated drawing systems. The monofilament drawing is done in-line using heated ovens.

-continued

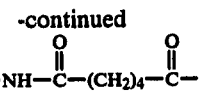
(C)

wherein R is a mixture of a straight chain aliphatic hydrocarbon radical containing six carbon atoms and an alkyl substituted saturated hydrocarbon chain, six carbon atoms in length, in which the alkyl substitution comprises three methyl groups with two of the three methyl groups on the same carbon atom. The ratio of the two hydrocarbon radicals is about 55/45 to about

TABLE 1

TERPOLYAMIDE MONOFILAMENT

| Sample | $T_m$ (C.°) | Melt Temp (C.°) | Denier (g/9000m) | Elongation (%) | Tenacity (g/d) | Initial Modulus (g/d) | Draw Ratio (X:1.0) |
|---|---|---|---|---|---|---|---|
| TA/IA/AA-HMDA/TMHMDA | | | | | | | |
| 65/25/10-75/25 | 273 | 302 | 1670 | 30.9 | 4.2 | 44.3 | 4.2 |
| | | | 1670 | 15.1 | 6.5 | 65.2 | 5.2 |
| | | | 1050 | 24.6 | 4.9 | 52.8 | 4.2 |
| 65/25/10-90/10 | 300 | 334 | 1320 | 12.4 | 5.0 | 55.5 | 4.5 |
| | | | 1040 | 11.6 | 5.6 | 60.3 | 5.2 |
| | | | 1830 | 33.2 | 3.3 | 39.7 | 3.3 |
| 65/25/10-100/0 | 310 | 334 | | 9.2 | 4.0 | 56.0 | 4.4 |
| | | 340 | 650 | ~11.5 | ~5.8 | | 5.2 |
| | | | ~900 | 21.3 | 3.6 | 54.7 | 5.2 |
| | | | 1050 | | | | |
| 75/15/10-90/10 | 306 | 334 | 1350 | 9.7 | 5.6 | 65.0 | 4.3 |
| | | | 1650 | 51.2 | 2.2 | 34.4 | 2.6 |
| | | | 1420 | 27.7 | 3.5 | 45.9 | 3.2 |
| | | | 1550 | 11.0 | 4.4 | 56.3 | 5.3 |

Suitably, in our process for the manufacture of copolyamides, the reaction temperature is kept in the range of about 260° to 315° C. The TA and mixtures of IA and AA are in the whole ratio of 65/35 to 85/15 are reacted with the mixture of HMDA and TMHMDA without the addition of any external solvent. The reactant melt temperature in our process is kept in the range of about 250° to 270° C. In the preferred process, the reaction is conducted in a Helicone reactor, preheated to a temperature of about 90° to 150° C. In our process for the manufacture of polyamides, about equal molar amounts of the mixture of HMDA and TMHMDA are reacted with the TA, IA and AA mixture or the TA, AA mixture. The molar ratio of HMDA to TMHMDA can be in the range of about 55/45 to about 95/5. The molar ratio of HMDA and TMHMDA to TA, and mixtures of IA and AA can be in the range of 1/65/35 to 1/85/15 with the molar ratio of AA to IA in the range of about 35/0 to about 5/30.

Our novel injection moldable crystalline polyamide copolymers of HMDA, TMHMDA and TA, IA and AA comprise the following recurring structural units:

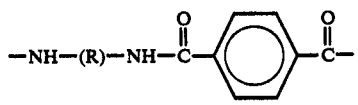
(A)

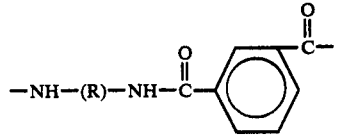
(B)

95/5. In the case of the HMDA, TMHMDA, TA, and AA copolyamides the structure is composed only of A and C moieties. The molar ratio of A:C units is about 51/49 to about 95/5. The preferred diamines for our novel compositions are 2,2,4-trimethylhexamethylene diamine, or 2,4,4-trimethylhexamethylene diamine or mixtures of these. The injection molding of our copolyamides is accomplished by injecting the copolyamide into a mold maintained at a temperature of about 100° to 200° C. In this process a 20-second to 1-minute cycle is used with a barrel temperature of about 320° to 350° C. These temperatures will vary depending on the Tg and Tm of the polyamide being molded. These copolyamides have excellent heat deflection and other physical properties.

With the addition of reinforcing materials, particularly the physical properties such as flexural strength are improved if the copolyamides contain from about 10 to 60 percent by weight glass fibers, glass beads, minerals, or mixtures thereof. In the preferred range, the copolyamides contain about 30 to 50 percent by weight of glass fibers, glass beads, or graphite, or mixtures thereof. Suitably, the reinforcing materials can be glass fibers, glass beads, glass spheres, or glass fabrics. The preferred fillers are glass fibers. These are made of alkali-free boron-silicate glass or alkali-containing C-glass. The thickness of the fibers is suitably on the average, between 3 mm and 30 mm. It is possible to use long fibers in the range of from 5 to 50 mm and also short fibers with each filament length of 0.05 to 5 mm. In principle, any standard commercial grade fiber, especially glass fibers, may be used. Glass fibers ranging from 5 mm to 50 mm in diameter may also be used as a reinforcing material.

The reinforcing polyamide polymers may be prepared in various ways. Suitably, so-called roving endless glass fiber strands are coated with the polyamide melt and subsequently granulated. Advantageously, the cut fibers and glass beads may also be placed with granulated polyamic acid and the resulting mixture melted in a conventional extruder, or alternatively, the fibers may be determined, introduced into the polyamic acid, and melted through a suitable inlet in the extruder. The injection molding conditions are given in Table 1 below.

TABLE 2

| | |
|---|---|
| Mold Temperature | 100 to 200° C. |
| Injection Pressure | 7,000 to 16,000 psi and held for 10 to 40 seconds |
| Back Pressure | 100 to 1,000 psi |
| Cycle Time | 20 to 60 seconds |
| Extruder: | |
| Nozzle Temperature | 330 to 360° C. |
| Barrels: | |
| Front Heated to | 320 to 350° C. |
| Screw: | 20 to 60 revolutions/minute |

Our process utilizes four major units. These are the salt reactor, the surge and aging vessel, the first polycondensation reactor, and the twin screw finishing reactor. Steam, advantageously, is used for pressure control on the first three stages. Steam use is helpful since we can control the extent of the reaction without worrying about unknown pressure leaks. Steam is also useful to our process since we use no water or low amounts of water in our feed material. When pressure make-up is required, use of nitrogen or another inert gas can cause a reduction in water partial pressure and cause a release of water from the salt. When the operating pressure is greater than the equilibrium steam partial pressure at operating temperatures, it will be advantageous to use an inert gas in addition to steam. In prior art processes, steam comes from the excess water in the feed, but in our novel process the extra water will be generated by the polycondensation reaction.

Feed materials can suitably be introduced to the first stage of our process, the salt reactor, in any of several ways. For example, pre-weighed charges can be fed to the salt reactor via lock hoppers. Another suitable procedure is a slurry feed of the HMDA and diacids. This has the advantage of putting the batch stage into less expensive equipment and reduces negative effects of cyclic operation on the first two stages. It also would allow easy analysis of feeds prior to its introduction to the process. Advantageously, the reactants can be charged as a paste via an extruder. Such as feed system could preheat the feed materials and would allow a minimal water level in the feed. The primary limitation of this system is that high temperature analytical equipment must be employed.

The salt reactor is a stirred tank reactor agitated by downward flowing pitched blade turbines. Impeller speed should be great enough to keep solids suspended until reacted. Pressure capability should be enough to prevent volatilization of the lowest boiling monomer component. Free water levels in the salt reactor can range from 0 percent (anhydrous feed materials) to about 25 to 30 percent. This is governed by feeding requirements and by phase equilibrium demands. Small amounts of water provide significant freezing point depression and improve processability of the various high melting salts.

The second vessel is a surge or aging vessel. It is at the same pressure and temperature as the salt reactor. It serves two functions. It translates the batch operation of the salt reactor to continuous operation when lock hopper feeding is used. It also allows the salt additional residence time to form fully and stabilize. The second stage also minimizes the possibility that unreacted monomer could pass through to the polycondensation reactor. The surge reactor can be non-agitated, but potential problems with gel justify the use of an agitated reactor.

The third stage of our process is the first polycondensation reactor. This reactor is a continuous stirred tank reactor and has a reduced pressure and an increased temperature over the two prior reactors. This reactor can be agitated by either a pitched blade turbine or a helical anchor. A helical anchor permits higher product viscosities and improved productivity in our final extruder reactor. An important factor in the success with our novel process has been control of melt rheology in the first polycondensation reactor by keeping inherent viscosity low. This concept allows us to minimize gel and polymer build-up problems in the first polycondensation reactor, but it does force more work on the finishing reactor. The balance between the first polycondensation reactor and the extruder will vary for each different resin just as the water level requirements in the feed will vary.

The final stage of the process is a twin screw extruder reactor. The twin screw extruder is an advantageous component in our process as to allows us to easily handle the stiff, high melting point resins that we manufacture. Other types of finishing reactors such as disk ring reactors, agitated stranding devolatilizers, and thin film evaporators can be utilized; however, some of these may have difficulty in handling the high viscosity of our resins.

Catalyst can suitably be employed in our process. These catalysts include the following compounds: $NaH_2PO_2$, $H_3PO_2$, $H_3PO_4$, $H_2SO_4$, HCl, $Na_3PO_3$, $NaH_2PO_4.H_2O$. The amount of catalyst present can vary from about 0.01 to about 0.2 weight percent of the total weight of the reactants. The preferred catalyst is sodium hypophosphite.

The following examples illustrate the preferred embodiment of this invention. It will be understood that the examples are for illustrative purposes only and do not purport to be wholly definitive with respect to the conditions or scope of the invention.

EXAMPLE 1

Preparation of Polymer

The composition of 65/35-90/10 TA/AA-HMDA/TMHMDA was used here as an example. The reactants were loaded into a 4CV Helicone reactor that had been preheated to 200°-250° F.; the temperature control was set at 605° F. The agitator was set at maximum, about 15 rpm. After about 15 minutes, the reactor pressure rose to 120 psi, and the melt temperature reached to about 425° F. The reactor pressure was held at 120 psi for 5 minutes, and then was vented down to 100 psi in 2 minutes, and was held at 100 psi for about 18 minutes as the melt temperature rose to 568° F. The reactor pressure was then vented down to atmospheric pressure over a 2 minute period. The reaction mixture was held under the nitrogen sweep for about 8 minutes and then dumped into water. The total reaction time for this run was about 50 minutes. The inherent viscosity of the resin was determined to be 1.45 dl/g.

Physical Testing

The 65/35-90/10 TA/AA-HMDA/TMHMDA and 75/15/10-90/10 TA/IA/AA-HMDA/TMHMDA polyamide resins were ground, dried in a vacuum oven overnight, mixed with 45 percent glass fibers, and injection molded into test bars. The material properties were tested under the ASTM standard conditions. The test results are shown in the following table.

TABLE 3

Material Properties of Polyamides

| Glass Fiber % | Tensile ASTM Method D-638 | | Flexural ASTM Method D-638 | | Notched Izod ASTM Method D-216 | HDT ASTM Method D-668 |
|---|---|---|---|---|---|---|
| | Strength M psi | Elongation % | Strength M psi | Modulus MM psi | ft-lb/in | (at 264 psi) °F. |
| 65/35-90/10 TA/AA-HMDA/TMHMDA (1.45 I.V.) | | | | | | |
| 0 | 13.2 | 5.1 | 19.7 | 0.44 | 0.8 | 234 |
| 45 | 37.6 | 5.7 | 53.2 | 1.80 | 3.0 | 571 |
| 75/15/10-90/10 TA/IA/AA-HMDA/TMHMDA (0.78 I.V.) | | | | | | |
| 0 | 13.2 | 4.8 | 21.1 | 0.52 | 0.7 | 245 |
| 45 | 37.6 | 5.6 | 52.2 | 1.82 | 3.8 | 580 |

EXAMPLE 2

In general, the 85/15-103* TA/IA-HMDA polyamide is difficult to make and difficult to injection mold, however, when 6% of the HMDA in the formulation is replaced by TMHMDA, the polyamide is easy to produce by melt process and easy to injection mold. The properties of the two polyamides filled with 45% glass fibers are shown in the following table:

*In many experiments, we use an excess of the diamine.

TABLE 4

| PROPERTIES OF 45% GLASS-FIBER FILLED 85/15 POLYAMIDES | | |
|---|---|---|
| HMDA/TMHMDA | 103/0 | 97/6 |
| Sample Code | Z229U | Z1156 |
| Resin I.V., dl/g | 1.03 | 1.04 |
| Tensile Strength, psi | 34,500 | 33,100 |
| Tensile Elongation, % | 4.5 | 4.0 |
| Flexural Strength, psi | 49,500 | 50,300 |
| Flexural Modulus, $10^6$ psi | 1.97 | 1.96 |
| Notched Izod, ft-lb/in | 3.8 | 3.5 |
| Tensile Impact, ft-lb/in$^2$ | 100 | 88 |
| HDT at 264 psi, °F. | >580 | >580 |
| Water Absorption, % | 0.21 | 0.16 |

We claim:

1. A crystalline moldable polyamide copolymer composition comprising the following recurring moieties:

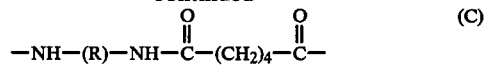  (A)

and

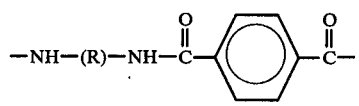  (B)

and

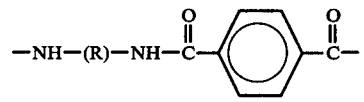  (C)

wherein R is a mixture of a straight chain aliphatic hydrocarbon radical comprising six carbon atoms and a trimethyl substituted saturated hydrocarbon radical, six carbon atoms in length, with two of the three methyl groups on the same carbon atom wherein the mole ratio of the two hydrocarbon radicals is about 55/45 to about 95/5 and wherein the mole ratio of the two hydrocarbon radicals is about 55/45 to about 95/5 and wherein the mole ratio of A/C or A/to a mixture of B and C is about 61/39 to 95/5, and the mole ratio of B to C is about 38/1 to 1/38.

2. The composition of claim 1 wherein the ratio of the straight chain hydrocarbon radical to the trialkyl substituted hydrocarbon radical is about 55 to about 45 to about 80 to about 20.

3. The composition of claim 2 wherein the straight chain hydrocarbon radical is hexamethylene and the trialkyl substituted hydrocarbon radical is 2,2,4-trimethylhexamethylene, 2,4,4-trimethylhexamethylene or a mixture of both.

4. A fiber composition of claim 1.

5. A fiber composition of claim 3.

6. The fiber of claim 5 wherein the fiber is an oriented fiber.

7. The fiber of claim 5 wherein the fiber is a drawn fiber.

8. A laminate of the composition of claim 1.

9. A crystalline moldable polyamide copolymer comprising the following recurring moieties:

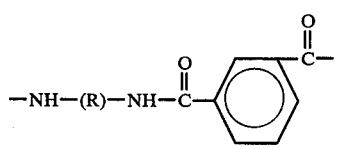  (I)

and

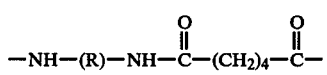  (II)

wherein R is a mixture of an aliphatic hydrocarbon radical comprising six carbon atoms and a trimethyl substituted saturated hydrocarbon radical, six carbon atoms in length, with two of the three methyl groups on the same carbon atom wherein the weight ratio of the two radicals is about 55/45 to about 95/5 and wherein the weight ratio of I:II is about 61/39 to 95/5.

10. The polyamide copolymer of claim 9 wherein the ratio of the straight chain hydrocarbon radical to the trimethyl substituted hydrocarbon radical is about 55 to about 45 to about 80 to about 20.

11. The polyamide copolymer of claim 10 wherein the straight chain hydrocarbon radical is hexamethylene and the trimethyl substituted hydrocarbon radical is 2,2,4-trimethylhexamethylene, 2,4,4-trimethylhexamethylene or a mixture of both.

12. A fiber of the copolymer of claim 9.

13. The fiber of claim 12 wherein the fiber is an oriented fiber.

14. The fiber of claim 12 wherein the fiber is a drawn fiber.

15. A laminate of the copolymer of claim 9.

16. A crystalline polyamide copolymer molding composition comprising the following recurring moieties:

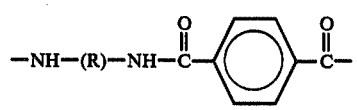

(A)

and

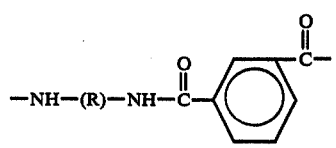

(B)

and

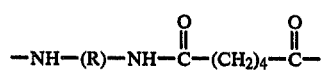

(C)

wherein R is a mixture of a straight chain aliphatic hydrocarbon radical comprising six carbon atoms and a trimethyl substituted saturated hydrocarbon radical, six carbon atoms in length, with two of the three methyl groups on the same carbon atom wherein the mole ratio of the two hydrocarbon radicals is about 55/45 to about 95/5 and wherein the mole ratio of the two hydrocarbon radicals is about 55/45 to about 95/5 and wherein the mole ratio of A/C or A/to a mixture of B and C is about 61/39 to 95/5, and the mole ratio of B to C is about 38/1 to about 1/38.

17. The composition of claim 16 comprising about 10 to about 60 percent of glass fibers, glass beads, mineral fibers, graphite fibers or mixtures of same.

18. The composition of claim 16 comprising about 40 to about 60 percent of glass fibers, glass beads, mineral fibers, graphite fibers or mixtures of same.

19. The polyamide copolymer molding composition of claim 16 wherein the ratio of the straight chain hydrocarbon radical to the trimethyl substituted hydrocarbon radical is about 55 to about 45 to about 80 to about 20.

20. The polyamide copolymer molding composition of claim 19 wherein the straight chain hydrocarbon radical is hexamethylene and the trimethyl substituted hydrocarbon radical is 2,2,4-trimethylhexamethylene, 2,4,4-trimethylhexamethylene or a mixture of same.

21. The composition of claim 20 comprising about 10 to about 60 percent of glass fibers, glass beads, mineral fibers, graphite fibers or a mixture of same.

22. The composition of claim 20 comprising about 40 to about 60 percent of glass fibers, glass beads, mineral fibers, graphite fibers or a mixture of same and wherein the copolymer has a heat deflection temperature in excess of 304° C.

23. A polyamide copolymer molding composition comprising the following recurring moieties:

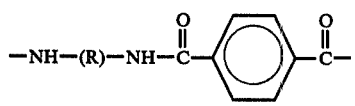

(I)

and

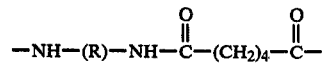

(II)

wherein R is a mixture of a straight chain aliphatic hydrocarbon radical comprising six carbon atoms and a trimethyl substituted saturated hydrocarbon radical, six carbon atoms in length, with two of the three methyl groups on the same carbon atom wherein the weight ratio of the two hydrocarbon radicals is about 55/45 to about 95/5 and wherein the weight ratio of I:II is about 61/39 to 95/5.

24. The composition of claim 23 comprising about 10 to about 60 percent of glass fibers, glass beads, mineral fibers, graphite fibers or mixturs of same.

25. The composition of claim 23 comprising about 40 to about 60 percent of glass fibers, glass beads, mineral fibers, graphite fibers or mixtures of same.

26. The polyamide copolymer molding composition of claim 23 wherein the ratio of the straight chain hydrocarbon radical to the methyl substituted hydrocarbon radical is about 55 to about 45 to about 80 to about 20.

27. The polyamide molding composition of claim 26 wherein the straight chain hydrocarbon radical is hexamethylene and the trimethyl substituted hydrocarbon radical is 2,2,4-trimethylhexamethylene, 2,4,4-trimethylhexamethylene or a mixture of same.

28. The composition of claim 27 comprising about 10 to about 60 percent of glass fibers, glass beads, mineral fibers, graphite fibers or a mixture of same.

* * * * *

UNITED STATES PATENT OFFICE
CERTIFICATE OF CORRECTION

Patent No. 4,476,280                Dated October 9, 1984

Inventor(s) POPPE, WASSILY - CHEN, YU-TSAI

It is certified that error appears in the above-identified patent and that said Letters Patent are hereby corrected as shown below:

| Column | Line | |
|---|---|---|
| 5 | 50 | "as" (second occurrence) should be -- a -- |
| 6 | 29 | "to" (first occurrence) should be -- it -- |
| 6 | 57 | "15" (first occurrence) should be -- 35 -- |
| 8 | 38 | "2,2,4-" should be -- 2,2,4- -- (moved to left margin) |
| 8 | 39 | "2,4,4-" should be -- 2,4,4- -- (moved to left margin) |
| 9 | 6 | "2,2,4-" should be -- 2,2,4- -- (moved to left margin) |
| 9 | 7 | "2,4,4-" should be -- 2,4,4- -- (moved to left margin) |
| 10 | 39 | "mixturs" should be -- mixtures -- |

Signed and Sealed this

Eleventh Day of June 1985

[SEAL]

Attest:

DONALD J. QUIGG

Attesting Officer      Acting Commissioner of Patents and Trademarks